(12) United States Patent
Moreno et al.

(10) Patent No.: US 11,997,988 B2
(45) Date of Patent: *Jun. 4, 2024

(54) METHOD AND SYSTEM FOR REAL-TIME LIVESTOCK MANAGEMENT

(71) Applicant: Premex, Inc., Durham, NC (US)

(72) Inventors: Andres Felipe Posada Moreno, Durham, NC (US); Daniel Jimenez Mejia, Durham, NC (US)

(73) Assignee: PREMEX, INC., Durham, NC (US)

( * ) Notice: Subject to any disclaimer, the term of this patent is extended or adjusted under 35 U.S.C. 154(b) by 790 days.

This patent is subject to a terminal disclaimer.

(21) Appl. No.: 17/070,261

(22) Filed: Oct. 14, 2020

(65) Prior Publication Data

US 2021/0029971 A1 Feb. 4, 2021

Related U.S. Application Data

(63) Continuation of application No. 16/225,740, filed on Dec. 19, 2018, now Pat. No. 10,806,130.

(60) Provisional application No. 62/607,500, filed on Dec. 19, 2017.

(51) Int. Cl.
  *A01K 29/00* (2006.01)
  *A23K 40/00* (2016.01)
  *A23K 50/00* (2016.01)
  *H04L 67/12* (2022.01)

(52) U.S. Cl.
  CPC ............ *A01K 29/005* (2013.01); *A23K 40/00* (2016.05); *A23K 50/00* (2016.05); *H04L 67/12* (2013.01)

(58) Field of Classification Search
  CPC .......... A01J 5/007; A01J 5/0131; A01J 99/00; A01K 29/00; A01K 5/02; A01K 29/005; A01K 5/0283; A23K 50/10; A23K 10/00; A23K 40/00; A23K 50/00; H04L 67/12
  See application file for complete search history.

(56) References Cited

U.S. PATENT DOCUMENTS

| | | | | |
|---|---|---|---|---|
| 5,351,644 A * | 10/1994 | Everett | ................ | A01K 29/005 119/840 |
| 8,036,429 B2 * | 10/2011 | Doyle, II | ............... | A01K 29/00 382/110 |
| 8,307,785 B2 * | 11/2012 | Zimmerman | ............ | A01K 5/02 119/51.02 |
| 8,317,720 B2 * | 11/2012 | Laurence | ............. | A01K 29/005 119/51.02 |
| 8,453,601 B2 * | 6/2013 | Zimmerman | ......... | A61M 15/00 119/51.02 |
| 8,642,262 B2 * | 2/2014 | Stroman | ............ | G06Q 30/0203 435/7.1 |
| 8,979,757 B2 * | 3/2015 | Mottram | ............... | A61B 5/6815 600/301 |
| 2004/0226519 A1 * | 11/2004 | Doucette | ................ | G06Q 10/10 119/51.02 |
| 2008/0145476 A1 * | 6/2008 | Beck | ..................... | A23K 10/30 426/2 |

(Continued)

*Primary Examiner* — Yvonne R Abbott-Lewis
*Assistant Examiner* — Yvonne Abbott
(74) *Attorney, Agent, or Firm* — Barnes & Thornburg LLP

(57) ABSTRACT

A method and system for managing livestock health in real-time is provided. The method and system analyze and detect anomalies in various livestock health-related parameters and provide a health management plan that includes nutritional recommendations for curing the anomalies. A method for manufacturing a livestock feed is also provided.

18 Claims, 2 Drawing Sheets

(56) References Cited

U.S. PATENT DOCUMENTS

| | | | |
|---|---|---|---|
| 2008/0215167 A1* | 9/2008 | Beck | A23K 50/10 |
| | | | 700/90 |
| 2008/0234995 A1* | 9/2008 | Newcomb | A01K 5/02 |
| | | | 703/11 |
| 2009/0288605 A1* | 11/2009 | De Villiers | A01J 5/0131 |
| | | | 119/14.08 |
| 2010/0170445 A1* | 7/2010 | Gerrit | A01K 5/0283 |
| | | | 119/14.08 |
| 2014/0116341 A1* | 5/2014 | Kopic | A01J 99/00 |
| | | | 119/14.02 |
| 2017/0068259 A1* | 3/2017 | Patz | B01F 35/2206 |
| 2019/0059336 A1* | 2/2019 | Robbins | A61B 5/01 |
| 2019/0183096 A1* | 6/2019 | Moreno | A23K 50/00 |

* cited by examiner

METHOD AND SYSTEM FOR REAL-TIME LIVESTOCK MANAGEMENT

CROSS REFERENCE TO RELATED APPLICATION

This application is a continuation of U.S. application Ser. No. 16/225,740, filed Dec. 19, 2018, which claims priority to U.S. Provisional Patent Application No. 62/607,500, filed on Dec. 19, 2017, both of which are incorporated by reference herein in its entirety.

BACKGROUND OF THE INVENTION

Livestock production currently suffers from a fragmented system where an animal may be weighed only a limited number of times during ownership. Any adjustments made to the livestock's nutritional program to accommodate for changes in weight, health status and other health indicators are not usually made or are made at a time that is too late to improve the animal's health. Even when changes to a livestock feed is made, a livestock owner is usually relegated to purchasing and feeding livestock from bulk purchased foodstuff. Such a lack of care may result in underweight, overweight or otherwise unhealthy livestock since particular livestock may need regular nutritional adjustments during their lifespan to compensate for changes in various factors. Such lack of nutritional adjustment and feeding conditions may result in profit loss for the livestock owner. Thus, there remains a need for system and method that addresses these and other challenges in real-time and provides a health management plan particularly suited to livestock in immediate need thereof.

SUMMARY OF THE INVENTION

According to one aspect, a method of managing livestock health in real-time is provided. The method includes the step of obtaining real-time livestock sensor data from at least one sensor located on or around one or more livestock. The data includes at least one of livestock weight, livestock activity level, livestock ammonia level, body temperature, body weight, water intake, or body pH. The method further includes the step of analyzing, by processor, the real-time livestock sensor data upon receipt from the at least one sensor to detect at least one anomaly in the livestock weight, livestock activity level, livestock ammonia level, body temperature, body weight, water intake, or body pH. Any one or more health-related anomalies may be analyzed and detected and stored in the system provided herein. The method further includes the step of generating a customized livestock health management plan that includes one or more recommended nutritional changes for the livestock in the form of a customized feedstock recipe. The recipe is particularly suited and customized to cure the at least one detected anomaly. The method further includes the step of transmitting the livestock health management plan wirelessly to at least one livestock owner interface as provided herein. Upon transmission to the livestock owner interface, the livestock owner has the option to confirming acceptance of the plan or denying acceptance. Upon confirmation of acceptance of the livestock health management plan, a wireless signal is sent to a feedstock producer including instructions to manufacture the customized feedstock recipe for the livestock owner. According to one embodiment of the method, the livestock sensor data is obtained from a plurality of sensors located on a plurality of livestock and the customized feedstock recipe may be fed to the plurality of livestock. According to one embodiment of the method, the livestock sensor data is obtained from at least one sensor on or around an individual livestock animal and the customized feedstock recipe may be fed to the individual livestock animal. According to one embodiment of the method, the at least one sensor transmits a particular code associated with an individual livestock animal such that the customized feedstock recipe is particularly suited for the one livestock animal that matches the particular code. According to one embodiment of the method, the customized feedstock recipe includes a change in protein, vitamin, mineral or caloric intake to correct the anomaly. According to one embodiment of the method, the health management plan further includes at least one livestock medical diagnosis and, optionally, at least one prescribed medicament.

According to another aspect, a system for livestock health management is provided. The system includes at least one server, at least one livestock owner interface including a data entry system, the livestock owner interface in wireless communication with a gateway and the at least one server, at least one livestock sensor, the livestock sensor coupled to a gateway that is in wireless communication with the at least one server, a livestock feed producer interface including a data entry system, the livestock manufacturer interface in wireless communication with the at least one server and livestock feed manufacturing equipment, and a memory and processor in wireless communication with the server, livestock owner interface, at least one livestock sensor and livestock producer interface. The memory and processor are configured to perform the step of obtaining real-time livestock sensor data from at least one sensor located on or around one or more livestock, the data including at least one of livestock weight, livestock activity level, livestock ammonia level, body temperature, body weight, water intake, or body pH. The memory and processor are also configured to perform the step of analyzing the real-time livestock sensor data to detect at least one anomaly in the livestock weight, livestock activity level, livestock ammonia level, body temperature, body weight, water intake, or body pH. The memory and processor are configured to perform the step of generating a customized livestock health management plan that includes a tailored feedstock recipe adapted to cure the at least one detected anomaly upon being fed to the livestock. The memory and processor are configured to perform the step of transmitting the livestock health management plan wirelessly to at least one livestock owner interface. According to one embodiment, the system further includes at least one livestock scale, the livestock scale coupled to a gateway that is in wireless communication with the at least one server, memory and processor. According to one embodiment, the system further includes at least one database coupled to or in wireless communication with a gateway that is in wireless communication with the at least one server, memory and processor. According to one embodiment, the livestock owner interface allows the livestock owner to enter individual livestock input data regarding at least one of feeding method, feed type, feeding schedule, medical history, breed, gender, breeding status, age, and body condition. According to one embodiment, the at least one server, memory and processor are configured to process one or more of owner input data, sensor data, and any normalized data to produce a health management plan that includes a customized livestock feedstock recipe that cures the at least one anomaly.

According to another aspect, a method for manufacturing a customized feed for at least one livestock animal is provided. The method includes the step of obtaining real-time livestock sensor data from at least one sensor located on or around one or more livestock. The data includes at least one of livestock weight, livestock activity level, livestock ammonia level, body temperature, body weight, water intake, or body pH. The method further includes the step of analyzing, by processor, the real-time livestock sensor data upon receipt from the at least one sensor to detect at least one anomaly in the livestock weight, livestock activity level, livestock ammonia level, body temperature, body weight, water intake, or body pH. Any one or more health-related anomalies may be analyzed and detected and stored in the system provided herein. The method further includes the step of generating a customized livestock health management plan that includes one or more recommended nutritional changes for the livestock in the form of a customized feedstock recipe. The recipe is particularly suited and customized to cure the at least one detected anomaly. The method further includes the step of transmitting the livestock health management plan wirelessly to at least one livestock owner interface as provided herein. Upon transmission to the livestock owner interface, the livestock owner confirms acceptance of the plan. Upon confirmation of acceptance of the livestock health management plan, a wireless signal is sent to a feedstock producer including instructions to manufacture the customized feedstock recipe for the livestock owner. The method further includes the step of manufacturing the customized livestock feed according to the customized livestock feed recipe. According to a particular embodiment, the method further includes the step of shipping the customized livestock feed to the livestock owner.

These and other features and advantages of the present disclosure will be further understood and appreciated by those skilled in the art by reference to the following specification, claims and appended drawings.

DETAILED DESCRIPTION OF THE INVENTION

Figure 1:
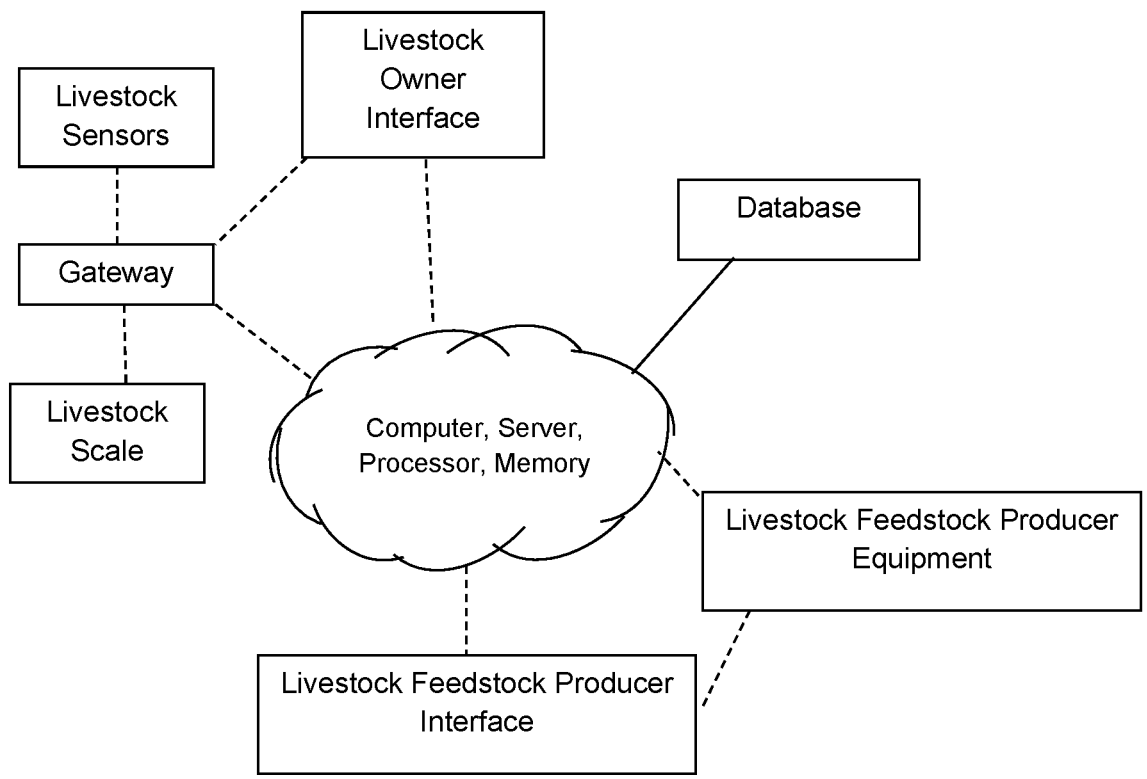
FIG. 1 is a schematic illustration of the major components of a system for livestock management according to one embodiment.

The present disclosure will now be described more fully hereinafter with reference to exemplary embodiments thereof. These exemplary embodiments are described so that this disclosure will be thorough and complete, and will fully convey the scope of the disclosure to those skilled in the art. Indeed, the present disclosure may be embodied in many different forms and should not be construed as limited to the embodiments set forth herein; rather, these embodiments are provided so that this disclosure will satisfy applicable legal requirements.

The embodiments described below may assume various alternative orientations and step sequences, except where expressly specified to the contrary. Specific devices and any related processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used in the specification, and in the appended claims, the singular forms "a", "an", "the", include plural referents unless the context clearly dictates otherwise.

As used in the specification, and in the appended claims, the term "livestock" refers to one or more animals kept or raised in an agricultural or farm setting for pleasure or profit.

As used in the specification, and in the appended claims, the term "medicament" refers to a substance used for medical treatment.

As used in the specification, and in the appended claims, the term "server" refers to a computer in a network utilized to process and provide data to other computers or components.

Livestock production currently suffers from a fragmented system where an animal's overall health and weight may not be monitored at all or the animal may be weighed only a limited number of times during ownership. Any adjustments made to the livestock's nutritional program to accommodate for changes in weight, health status and other health indicators are not usually made or, if nutritional changes are made, such changes are made at a time that is too late to improve the animal's health or the nutritional changes are merely the livestock owner purchasing a different stock feed in a blind attempt to improve health or weight. That is, even when changes to a livestock feed is made, a livestock owner is usually relegated to purchasing and feeding livestock from bulk purchased feed that may not provide the nutritional value that is needed to cure the changes in livestock health or weight.

The present disclosure provides a significant improvement over the traditional methods buying bulk stock feed in an effort to improve livestock overall health and weight. The present disclosure provides a system and method for measuring various individual livestock physical parameters (individual animal or normalized over an entire herd) in real-time. The system and method may also include sensors for environmental parameters. The present system and method seek to manage the health of one or more livestock animals in real-time. Thus, the present disclosure provides a substantial advancement over the current state of the art which relies on a livestock owner to buy stock feed based on limited parameters or data such as livestock weight which is not typically obtained on a regular basis. By providing a system and method that can monitor both a livestock environment and various physical health parameters of the livestock in real-time, a customized health management plan is developed to improve the health of the livestock in real-time when one or more anomalies are detected in one or more livestock. Such real-time, quick and efficient response results in healthier livestock which provides improved profits for the livestock owner. For example, if the livestock is a herd of beef cattle, the livestock owners profits will be improved by having heavier, healthier cattle that will provide more meat at slaughter.

According to a particular embodiment, the health of the livestock may be managed by processing data obtained from the livestock itself, any data input from the livestock owner, as well data related to the livestock environment. The real-time data is continuously analyzed in real-time to detect at least one change or anomaly in livestock health. According to one embodiment, the at least one anomaly may include a deviation in ideal livestock weight, livestock activity level, livestock ammonia level, body temperature, body weight, water intake, or body pH. According to one embodiment the analysis includes a comparison of the aforementioned physical characteristics against a set of ideal, physical and environmental parameters for a particular animals breed. When at least one anomaly is detected by the system as provided herein, a signal or alert is immediately transmitted (e.g., wirelessly) to the livestock owner notifying the owner of anomaly in the livestock's physical well-being or health or an anomaly in the livestock's environment. The signal includes a health management plan that, in turn, includes a nutritional plan that includes a customized feedstock recipe to aid in curing the anomaly. A nutritional plan may include recommendations for a feed that is customized to include or remove certain one or more nutritional components that would improve the overall health and weight of the livestock. The livestock owner can confirm or approve the nutritional plan which then signals the feed producer to manufacture the new customized feedstock for the livestock owner. The feed may then be immediately shipped to the livestock owner.

According to another embodiment, an anomaly in the livestock's environment may be analyzed and detected. Such environmental anomalies include a deviation in environmental temperature, environmental humidity, rain quantity, wind speed, and trough water temperature. When at least one anomaly is detected by the system as provided herein, a signal or alert is immediately transmitted (e.g., wirelessly) to the livestock owner notifying the owner of the anomaly to that corrective measures may be taken.

According to one embodiment, the system as provided herein includes the components shown in FIG. 1. According to one embodiment, the system as provided herein includes at least one livestock owner interface including a data entry system. The livestock owner interface may be in wireless communication with a gateway, at least one server, processor and memory. According to one embodiment, the livestock owner interface includes a livestock owner portal for owner access to the system as provided herein. According to one embodiment, the owner interface includes an application that may be installed on a stationary device such as, for example, a desktop computer. According to one embodiment, the owner interface includes an application that may be installed on a mobile device such as laptop computer or smart device such as a smart phone or tablet. According to either embodiment, a user-friendly dashboard may be provided. According to one embodiment, the owner interface includes at least one means for authentication and authorization. According to one embodiment, each livestock owner utilizes a custom user name and password that allows access to a particular livestock owner. According to one embodiment, the owner interface allows an owner to review a livestock health management plan that has been generated, historical data or any real-time or live data being recorded by one or more real-time livestock data sensors on or around the livestock or throughout the farm.

According to one embodiment, a livestock owner may input data related to a particular livestock animal or a group of livestock animals. Any particular livestock animal may be assigned a particular code that is transmitted to identify that particular livestock animal. According to one embodiment, the livestock owner utilizes the livestock owner interface to input data. According to one embodiment, the user interface provides a questionnaire or a series of questions for the livestock owner to answer. Such livestock owner input data includes, but is not limited to, a least one of medical history, breed, gender, breeding status, age, current weight, feeding schedule, and body condition. According to one embodiment, the livestock owner may upload information related to livestock animal stool, hair, blood, saliva, tissue, oral/dental health, skeletal health, or DNA/genetic profile if such information is already known.

According to one embodiment, the system includes at least one livestock sensor. The at least one livestock sensor may be coupled to a gateway that is in wireless communication with the at least one server, processor and memory. According to one embodiment, the one or more sensors is coupled to or wirelessly connected to at least one custom electronic board. According to one embodiment, the electronic board filters a data signal from the sensor and transmits the data signal to the gateway. The gateway, in turn, transmits the data signal wirelessly (e.g., via internet or through cellular network) to the at least one server, processor and memory. According to one embodiment, the livestock sensor data may be viewed via the livestock owner interface in real-time. According to one embodiment, the at least one livestock sensor wirelessly transmits sensor data in real-time including data related to at least one of livestock activity level, livestock ammonia level, body temperature, body weight, water intake, body pH, environmental temperature, environmental humidity, rain quantity, wind speed, and trough water temperature.

According to one embodiment, one or more sensors are located throughout the agricultural environment or farm where livestock are located. The one or more sensors may be installed in various locations throughout the livestock's environment. According to one embodiment, the one or more sensors are installed inside a barn or stable. According to one embodiment, the one or more sensors are installed outside a barn or stable such as, for example, in a pasture or grazing area where the livestock reside during daytime hours. According to one embodiment, the at least one sensor detects at least one of livestock activity level, livestock ammonia level, body temperature, body weight, water intake, body pH, environmental temperature, environmental humidity, rain quantity, wind speed, and trough water temperature. According to one embodiment, certain sensor data is obtained through various commercial sensors. According to one embodiment, a sensor containing a statistical-based algorithm is utilized to measure livestock physical activity.

According to one embodiment, the system may optionally include at least one livestock scale. The livestock scale may be coupled to a gateway that is in wireless communication with the at least one server, processor and memory. According to one embodiment, the at least one livestock scale transmits weight data to a gateway that is in wireless communication with at least one server, processor and memory. According to one embodiment, certain sensor data is obtained through one or more commercially available smart scales.

According to one embodiment, the system includes at least one database. The at least one database may be coupled to or in wireless communication with a gateway that is, in turn, in wireless communication with the at least one server, processor and memory. According to one embodiment, a database is provided that stores and maintains various standardized data with respect to each of the health profiles of particular livestock types and the genetic information of particular livestock types (herd or individual livestock). According to one embodiment, the database maintains one or more licenses to access one or more data services which aid in and provide data related to disease diagnosis, prescriptions medicines, health assessment data and genetic data. According to one embodiment, the aforementioned information is received, standardized or normalized and stored for later use. According to one embodiment, all standard data is cleaned and aggregated before further processing.

According to one embodiment, the system includes at least one server. The at least one server may be located in a cloud configuration. According to one embodiment, the system includes at least one computer coupled to the at least one server. The at least one computer may be located in a cloud configuration and coupled or in communication with the at least one server. The computer includes at least one processor and memory for analyzing the data as providing here and detecting at least one anomaly.

According to one embodiment, the data as provided herein is entered into or received into a cloud pipeline system. According to one embodiment, the cloud pipeline system includes at least one server, processor and memory to receive, analyze, process, detect anomalies and store the various data as provided herein. According to one embodiment, the cloud pipeline system includes more than one or a plurality (e.g., cluster) of servers receive, process and store the various data as provided herein. According to one embodiment, the cloud pipeline system includes at least one computer to receive, analyze, process, detect anomalies, and store the various data as provided herein. According to one embodiment, at least one server are configured to receive, process and store the various data as provided herein. The number of servers, computers or a combination thereof is scalable and varies depending on data size.

According to one embodiment, one or more statistical or machine learning models may be utilized to process the data as provided herein. According to one embodiment, the statistical model is one more of lineal regression, logistical regression, logarithmical regression, survival analysis, anovas, principal competent analysis, ARIMA, or any combination thereof. According to one embodiment, the machine learning model is one or more of decision trees, regression trees, random forest, gradient boosting machine, support vector machine, neural network bayesian network, or any combination thereof.

According to one embodiment, the system includes a livestock feed producer interface. The manufacturer interface may include a data entry system. The livestock producer interface may be in wireless communication with at least one server. According to one embodiment, the livestock producer interface is in wireless communication with livestock feed manufacturing equipment. According to one embodiment, a food product manufacturing apparatus is in wireless communication with at least one server, processor and memory.

According to one embodiment, a livestock health management plan is generated and provided by the methods and systems provided herein. The plan may include various identifying information such as a client or user identification number and time stamp. According to one embodiment, the plan is provided to the livestock owner wirelessly via the livestock owner interface. According to one embodiment, the plan is provided to a livestock feed producer wirelessly via the livestock feed manufacturer interface or directly to the livestock feed manufacturing equipment upon confirmation of acceptance by the livestock owner. According to one embodiment, the plan is conveyed to a pre-determined livestock veterinarian to recommend potential therapeutic components to the diet or a therapeutic treatment regimen, if appropriate.

According to one embodiment, the livestock health management plan provides various information and suggestions for the livestock owner regarding the health and well-being of the livestock, including suggestions for improvement. According to one embodiment, the livestock health management plan provides an adaptive and customized nutritional plan. The nutritional plan may provide suggestions as to changes in the diet for a particular livestock animal or a group of livestock animals. The changes to diet include, but are not limited to, changes in protein intake and overall caloric intake. The nutritional plan further includes a customized feedstock recipe that is particularly tailored to address at least one anomaly that was analyzed and detected.

According to one embodiment, upon acceptance of the plan by the livestock owner and transmission to the livestock feed producer, the livestock feed producer utilizes the nutritional plan and customized feedstock recipe to formulate and manufacture a customized feed for a particular livestock animal or a particular livestock animal group (herd) at a particular farm. According to one embodiment, the livestock feed producer may adjust various nutritional components in feed such as, for example, vitamin content, mineral content, caloric content, and protein content. The customized feed may then be shipped directly to the livestock owner's farm for immediate use.

According to one embodiment, the livestock health management plan provides various information and suggestions for the livestock owner regarding medical disease diagnosis and treatment regimen. According to one embodiment, anomalies in the consumption of feed and water as well as anomalies in body temperature may alert the livestock owner to possible diseases and suggest a treatment regimen. According to one embodiment, the treatment regimen may include the suggestion of the introduction of one or more medicaments to the livestock animal.

According to one embodiment, the livestock health management plan provides various information and suggestions for the livestock owner regarding the market condition information and suggestions for a particular type of livestock. According to one embodiment, the market condition information includes, but is not limited to, market prices, target sale prices, market futures, and other related market information to assist the livestock owner in optimizing the selling logistics. According to one embodiment, the livestock health management plan provides suggestions for changes in farm infrastructure, livestock management practices, or a combination thereof.

According to one embodiment, data and reports, such as sensor data as provided herein, may be managed and stored in a NoSQL ("non SQL" or "non-relational") database such as that provided by Apache Cassandra. According to one embodiment, the NoSQL database provides a mechanism for storage and retrieval of data and reports as provided herein that is modeled in means other than the tabular relations used in relational databases.

Figure 2:
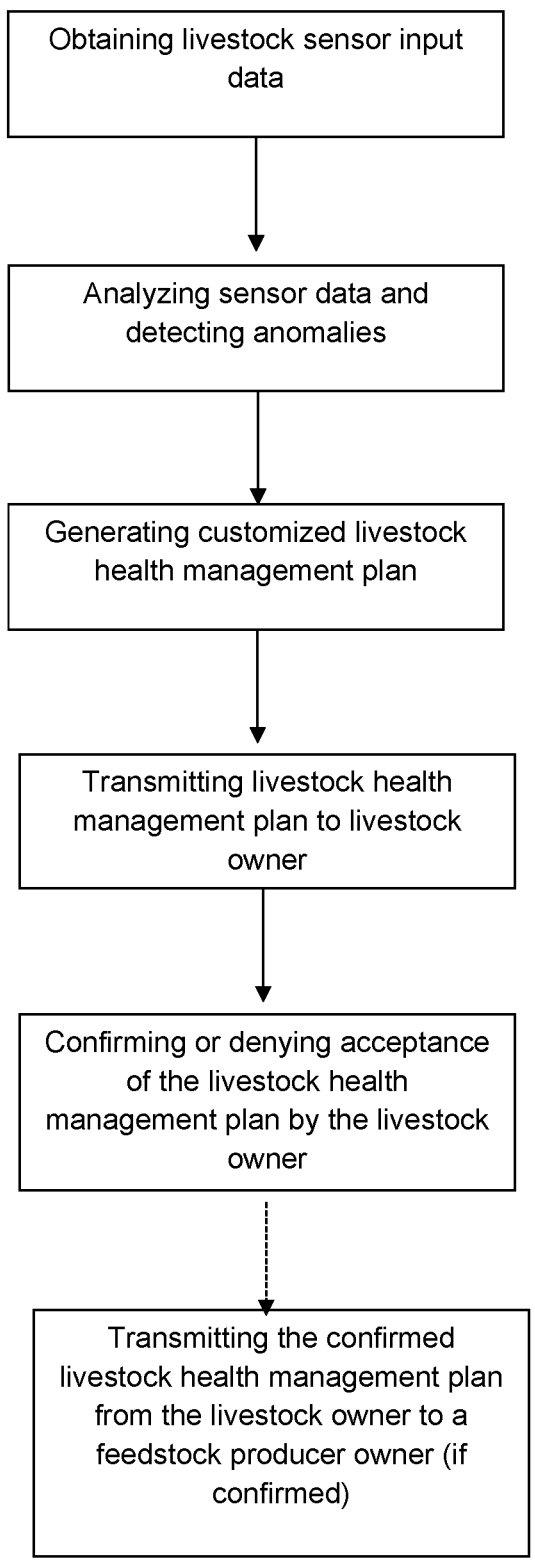
FIG. 2 is a flow chart illustrating a method of managing livestock health in real-time according to one embodiment.

A method of managing livestock health in real-time is provided. The method is illustrated in FIG. 2. The method includes the step of obtaining real-time livestock sensor data from at least one sensor located on or around one or more livestock. The data includes at least one of livestock weight, livestock activity level, livestock ammonia level, body temperature, body weight, water intake, or body pH. The data is transmitted wirelessly to one or more of a server, processor and memory as provided herein. The method further includes the step of analyzing, by processor, the real-time livestock sensor data upon receipt from the at least one sensor to detect at least one anomaly in the livestock weight, livestock activity level, livestock ammonia level, body temperature, body weight, water intake, or body pH. Any one or more health-related anomalies may be analyzed, detected and stored in the system provided herein. The method further includes the step of generating a customized livestock health management plan that includes one or more recommended nutritional changes for the livestock in the form of a customized feedstock recipe. The recipe is particularly suited and customized to cure the at least one detected anomaly. The method further includes the step of transmitting the livestock health management plan wirelessly to at least one livestock owner interface as provided herein. Upon transmission to the livestock owner interface, the livestock owner has the option to confirming acceptance of the plan or denying acceptance. Upon confirmation of acceptance of the livestock health management plan, a wireless signal is sent to a feedstock producer including instructions to manufacture the customized feedstock recipe for the livestock owner.

According to one embodiment of the method, the livestock sensor data is obtained from a plurality of sensors located on a plurality of livestock and the customized feedstock recipe may be fed to the plurality of livestock. According to one embodiment of the method, the livestock sensor data is obtained from at least one sensor on or around an individual livestock animal and the customized feedstock recipe may be fed to the individual livestock animal. According to one embodiment of the method, the at least one sensor transmits a particular code associated with an individual livestock animal such that the customized feedstock recipe is particularly suited for the one livestock animal that matches the particular code. According to one embodiment of the method, the customized feedstock recipe includes a change in protein, vitamin, mineral or caloric intake to correct the anomaly. According to one embodiment of the method, the health management plan further includes at least one livestock medical diagnosis and, optionally, at least one prescribed medicament.

A method for manufacturing a customized feed for at least one livestock animal is provided. The method includes the step of obtaining real-time livestock sensor data from at least one sensor located on or around one or more livestock. The data includes at least one of livestock weight, livestock activity level, livestock ammonia level, body temperature, body weight, water intake, or body pH. The method further includes the step of analyzing, by processor, the real-time livestock sensor data upon receipt from the at least one sensor to detect at least one anomaly in the livestock weight, livestock activity level, livestock ammonia level, body temperature, body weight, water intake, or body pH. Any one or more health-related anomalies may be analyzed and detected and stored in the system provided herein. The method further includes the step of generating a customized livestock health management plan that includes one or more recommended nutritional changes for the livestock in the form of a customized feedstock recipe. The recipe is particularly suited and customized to cure the at least one detected anomaly. The method further includes the step of transmitting the livestock health management plan wirelessly to at least one livestock owner interface as provided herein. Upon transmission to the livestock owner interface, the livestock owner confirms acceptance of the plan. Upon confirmation of acceptance of the livestock health management plan, a wireless signal is sent to a feedstock producer including instructions to manufacture the customized feedstock recipe for the livestock owner. The method further includes the step of manufacturing the customized livestock feed according to the customized livestock feed recipe. According to a particular embodiment, the method further includes the step of shipping the customized livestock feed to the livestock owner.

Although specific embodiments of the present invention are herein illustrated and described in detail, the invention is not limited thereto. The above detailed descriptions are provided as exemplary of the present invention and should not be construed as constituting any limitation of the invention. Modifications will be obvious to those skilled in the art, and all modifications that do not depart from the spirit of the invention are intended to be included with the scope of the appended claims.

We claim:

1. A method of managing livestock health in real-time, the method comprising
    obtaining real-time livestock sensor data from at least one sensor located on or around one or more livestock, the data comprising at least one of livestock weight, livestock activity level, livestock ammonia level, body temperature, body weight, water intake, or body pH;
    analyzing, by processor, the real-time livestock sensor data to detect at least one anomaly in the livestock weight, livestock activity level, livestock ammonia level, body temperature, body weight, water intake, or body pH;
    generating a customized livestock health management plan;
    transmitting the livestock health management plan wirelessly to at least one livestock owner interface; and
    confirming or denying acceptance of the livestock health management plan by the livestock owner.

2. The method of claim 1, wherein the livestock health management plan includes a customized feedstock recipe adapted to cure the at least one detected anomaly upon being fed to the livestock.

3. The method of claim 2, wherein the customized feedstock recipe includes a change in protein, vitamin, mineral or caloric intake to correct the anomaly.

4. The method of claim 1, wherein upon confirmation of acceptance of the livestock health management plan, a wireless signal is sent to a feedstock producer including instructions to manufacture the customized feedstock recipe for the livestock owner.

5. The method of claim 1, wherein the livestock owner interface includes a livestock owner portal.

6. The method of claim 5, wherein the livestock owner interface is a laptop or smart device.

7. The method of claim 1, wherein the livestock sensor data is obtained from a plurality of sensors located on a plurality of livestock and the customized feedstock recipe may be fed to the plurality of livestock.

8. The method of claim 1, wherein the livestock sensor data is obtained from at least one sensor on or around an individual livestock animal and the customized feedstock recipe may be fed to the individual livestock animal.

9. The method of claim 8, wherein the at least one livestock sensor transmits a particular code associated with an individual livestock animal.

10. The method of claim 1, wherein the health management plan further includes at least one livestock medical diagnosis and, optionally, at least one prescribed medicament.

11. A system for livestock health management comprising:
    at least one server;
    at least one livestock owner interface including a data entry system, the livestock owner interface in wireless communication with a gateway and the at least one server;
    at least one livestock sensor, the livestock sensor coupled to a gateway that is in wireless communication with the at least one server;

a livestock feed producer interface including a data entry system, the livestock manufacturer interface in wireless communication with the at least one server and livestock feed manufacturing equipment; and a memory and processor in wireless communication with the server, livestock owner interface, at least one livestock sensor and livestock producer interface, the memory and processor configured to perform the steps of:

obtaining real-time livestock sensor data from at least one sensor located on or around one or more livestock, the data comprising at least one of livestock weight, livestock activity level, livestock ammonia level, body temperature, body weight, water intake, or body pH;

analyzing the real-time livestock sensor data to detect at least one anomaly in the livestock weight, livestock activity level, livestock ammonia level, body temperature, body weight, water intake, or body pH;

generating a customized livestock health management plan that includes a tailored feedstock recipe adapted to cure the at least one detected anomaly upon being fed to the livestock;

transmitting the livestock health management plan wirelessly to at least one livestock owner interface; and confirming or denying acceptance of the livestock health management plan by the livestock owner.

12. The system of claim 11, wherein the memory and processor are configured to perform the additional step of transmitting the livestock health management plan wirelessly to at least one livestock owner interface.

13. The system of claim 11, further comprising at least one livestock scale, the livestock scale coupled to a gateway that is in wireless communication with the at least one server, memory and processor.

14. The system of claim 11, further comprising at least one database coupled to or in wireless communication with a gateway that is in wireless communication with the at least one server, memory and processor.

15. The system of claim 11, wherein the livestock owner interface allows the livestock owner to enter individual livestock input data regarding at least one of feeding method, feed type, feeding schedule, medical history, breed, gender, breeding status, age, and body condition.

16. The system of claim 11, wherein the at least one server, memory and processor are configured to process one or more of owner input data, sensor data, and any normalized data to produce a health management plan that includes a customized livestock feedstock recipe that cures the at least one anomaly.

17. A method for manufacturing a customized feed for at least one livestock animal, the method comprising the steps of:

obtaining real-time livestock sensor data from at least one sensor located on or around one or more livestock, the data comprising at least one of livestock weight, livestock activity level, livestock ammonia level, body temperature, body weight, water intake, or body pH;

analyzing, by processor, the real-time livestock sensor data to detect at least one anomaly in the livestock weight, livestock activity level, livestock ammonia level, body temperature, body weight, water intake, or body pH;

generating a customized livestock health management plan that includes a tailored feedstock recipe adapted to cure the at least one detected anomaly upon being fed to the livestock;

transmitting the livestock health management plan wirelessly to at least one livestock owner interface; and confirming or denying acceptance of the livestock health management plan by the livestock owner.

18. The method of 17, further comprising the steps of:

transmitting the confirmed livestock health management plan from the livestock owner to a feedstock producer;

manufacturing the customized livestock feed according to the customized livestock feed recipe; and shipping the customized livestock feed to the livestock owner.

\* \* \* \* \*